G. Custer,
Apple Slicer and Corer.
Nº 66,951.   Patented July 23, 1867.
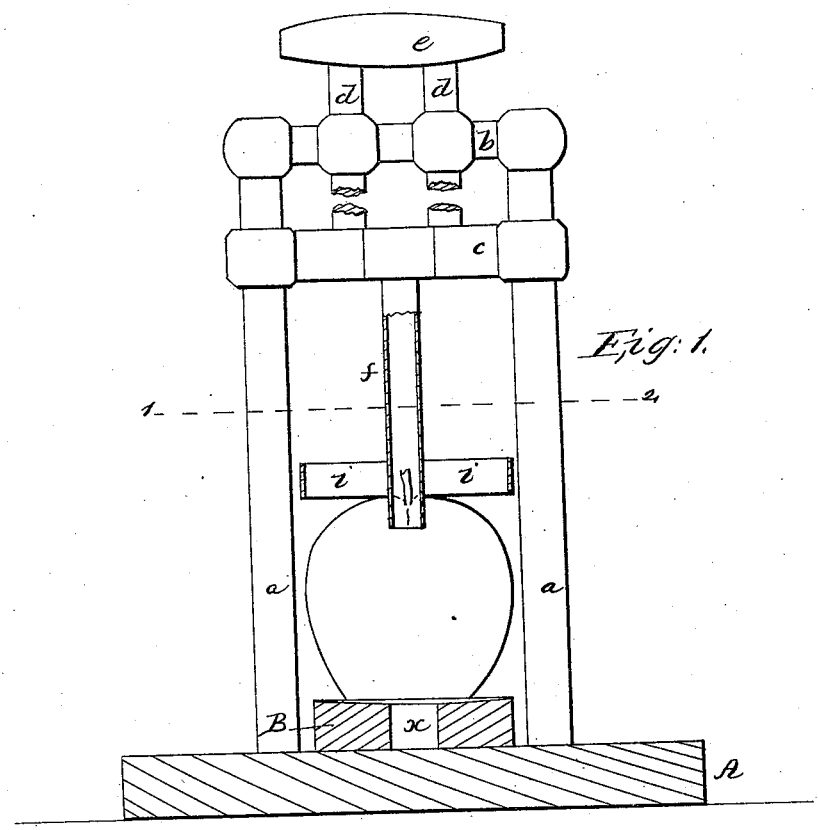
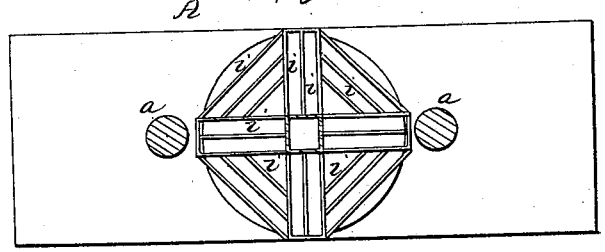
Witnesses:
Inventor:

United States Patent Office.

GEORGE CUSTER, OF NORRISTOWN, PENNSYLVANIA, ASSIGNOR TO HIMSELF AND E. B. FRICK, OF SAME PLACE.

Letters Patent No. 66,951, dated July 23, 1867.

---

IMPROVED APPLE-CORER AND SLICER.

---

The Schedule referred to in these Letters Patent and making part of the same.

---

TO ALL WHOM IT MAY CONCERN:

Be it known that I, GEORGE CUSTER, of Norristown, Montgomery county, Pennsylvania, have invented an Instrument for Coring and Dividing Apples; and I do hereby declare the following to be a full, clear, and exact description of the same.

My invention consists of a machine, constructed as fully described hereafter, so as to quickly divide apples and remove the cores from the same, the said machine being efficient, simple in construction, and not liable to get out of order.

In order to enable others skilled in the art to make and use my invention, I will now proceed to describe its construction and operation, reference being had to the accompanying drawing, which forms a part of this specification, and in which—

Figure 1 is an elevation, partly in section, of my improved machine for dividing and coring apples, and
Figure 2 is a sectional plan view on the line 1 2, fig. 1.

A is the base of the machine, to which are attached two parallel upright rods or standards $a\ a$, the latter being connected at the top by a cross-bar, $b$. On the rods $a\ a$ slides a cross-head, $c$, to which are attached the lower ends of two parallel rods $d\ d$, the latter sliding in the cross-bar $b$, and being connected at the top by a cross-piece, $e$. Through the cross-head $c$ passes a square tube, $f$, open at both ends, and to this tube, near its lower end, are secured sharp-edged plates or knives $i\ i$, to which are connected diagonal sharp-edged plates or knives $i'\ i'$, as shown in fig. 2. To the base-plate A, between the two standards $a\ a$, is secured a block, B, in the centre of which is an opening, $x$.

The cross-head is elevated to its greatest extent, and the apple to be cored and cut is placed upon the block B, in the position shown in fig. 1. The cross-head is now depressed until the edges of the knives $i\ i'$ are in contact with the block B, the said knives dividing the apple, while the central portion or "core" remains in the tube $c$. When another apple is cut, its core, as the cross-head is depressed, will enter the tube $f$, and will force upward from the latter the core of the apple previously cut.

It will be seen that this machine is efficient, simple in construction, may be cheaply made, and is not liable to get out of order.

I claim as my invention, and desire to secure by Letters Patent—

The base A, its block B, uprights $a\ a$, and cross-piece $b$, in combination with the sliding cross-head $c$, tube $f$, knives $i\ i'$, rods $d\ d$, and cross-piece $e$, the whole being constructed, arranged, and operating substantially as described.

In testimony whereof I have signed my name to this specification in the presence of two subscribing witnesses.

GEORGE CUSTER.

Witnesses:
 JOHN WHITE,
 W. J. R. DELANY.